US009703506B2

United States Patent
Iizawa

(10) Patent No.: US 9,703,506 B2
(45) Date of Patent: Jul. 11, 2017

(54) STORAGE APPARATUS AND DATA STORAGE METHOD

(71) Applicant: FUJITSU LIMITED, Kawasaki-shi, Kanagawa (JP)

(72) Inventor: Ken Iizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 14/670,466

(22) Filed: Mar. 27, 2015

(65) Prior Publication Data

US 2015/0277796 A1 Oct. 1, 2015

(30) Foreign Application Priority Data

Mar. 31, 2014 (JP) ................................. 2014-071734

(51) Int. Cl.
*G06F 12/00* (2006.01)
*G06F 3/06* (2006.01)

(52) U.S. Cl.
CPC .............. *G06F 3/067* (2013.01); *G06F 3/061* (2013.01); *G06F 3/0656* (2013.01)

(58) Field of Classification Search
CPC .. G06F 12/00; G06F 11/1446; G06F 11/1448; G06F 11/1451; G06F 11/1453; G06F 11/1456; G06F 11/1461; G06F 11/1464
USPC .......................... 711/100, 154, 161, 162, 163
See application file for complete search history.

(56) References Cited

U.S. PATENT DOCUMENTS

| 5,548,737 A | * | 8/1996 | Edrington | ............. G06F 9/5027 712/200 |
| 8,938,479 B1 | * | 1/2015 | Dwivedi | ........... G06F 17/30091 707/696 |
| 2003/0229764 A1 | * | 12/2003 | Ohno | ...................... G06F 3/061 711/147 |
| 2006/0218365 A1 | | 9/2006 | Osaki et al. | |

FOREIGN PATENT DOCUMENTS

| JP | 2002-7450 | 1/2002 |
| JP | 2006-268829 | 10/2006 |
| JP | 2013-46219 A | 3/2013 |

OTHER PUBLICATIONS

Japanese Office Action issued on May 2, 2017 for corresponding Japanese Patent Application No. 2014-071734, with English Translation, 6 pages.

* cited by examiner

*Primary Examiner* — Tuan Thai
(74) *Attorney, Agent, or Firm* — Fujitsu Patent Center

(57) ABSTRACT

A storage apparatus acquires a data block including event data, time series information, first attribute information, and second attribute information. A first temporary accumulating unit and a second temporary accumulating unit temporarily accumulate the acquired data block in a first temporary storage unit and a second temporary storage unit, respectively. A first storing unit sorts a plurality of data blocks accumulated in the first temporary storage unit by the first attribute information and in a time series order identified from the time series information, and stores the sorted data blocks in a first storage unit. A second storing unit sorts a plurality of data blocks accumulated in the second temporary storage unit by the second attribute information and in a time series order identified from the time series information, and stores the sorted data blocks in a second storage unit.

14 Claims, 19 Drawing Sheets

FIG. 5

200 WRITE REQUEST

| | | |
|---|---|---|
| EVENT DATA ID | | 1 |
| METADATA | TRANSMISSION SOURCE IP ADDRESS | 192.168.0.1 |
| | TRANSMISSION DESTINATION IP ADDRESS | 192.168.100.100 |
| | COMMUNICATION PROTOCOL | TCP |
| | START TIME | 2013/09/30/12:00 |
| EVENT DATA | | ... |

FIG. 6

*210 SEARCH REQUEST

| SEARCH CONDITION | TRANSMISSION SOURCE IP ADDRESS | 192.168.0.1 |
|---|---|---|
| | TRANSMISSION DESTINATION IP ADDRESS | * |
| | COMMUNICATION PROTOCOL | * |
| | START TIME | 2013/09/30/12 : 00-2013/09/30/13 : 00 |

FIG. 7

220 READ REQUEST

| EVENT DATA ID | | 3,5 |
|---|---|---|
| SEARCH CONDITION | TRANSMISSION SOURCE IP ADDRESS | 192.168.0.1 |
| | TRANSMISSION DESTINATION IP ADDRESS | * |
| | COMMUNICATION PROTOCOL | * |
| | START TIME | 2013/09/30/12 : 00-2013/09/30/13 : 00 |

FIG. 9

230 SERVER INFORMATION

| SERVER ID | SORT KEY |
|---|---|
| #1 | TRANSMISSION SOURCE IP ADDRESS |
| #2 | TRANSMISSION DESTINATION IP ADDRESS |
| #3 | COMMUNICATION PROTOCOL |

STORAGE APPARATUS AND DATA STORAGE METHOD

CROSS-REFERENCE TO RELATED APPLICATION

This application is based upon and claims the benefit of priority of the prior Japanese Patent Application No. 2014-071734, filed on Mar. 31, 2014, the entire contents of which are incorporated herein by reference.

FIELD

The embodiments discussed herein relate to a storage apparatus and a data storage method.

BACKGROUND

There are known packet capturing systems, or the like, configured to capture packets flowing through an IP (Internet Protocol) network, as storage systems which sequentially accumulate sets of data arriving in a time series order. Such a storage system, based on a client-server configuration, has a redundancy that a plurality of servers holds identical data in order to ensure reliability. In addition, a proxy provided between clients and servers performs load sharing to distribute requests from the clients among the servers for the purpose of load distribution.

Japanese Laid-Open Patent Publication No. 2006-268829
Japanese Laid-Open Patent Publication No. 2002-7450

In a storage system such as a packet capturing system, write accesses generally occur more frequently than read accesses and therefore storage apparatuses are desired to exhibit sufficient data write performance.

However, when a storage system such as a packet capturing system performs a read access to a storage apparatus while performing a write access to the same storage apparatus, write performance of the storage apparatus may degrade.

SUMMARY

According to an aspect, there is provided a storage apparatus that includes a processor configured to perform a procedure including: acquiring a data block including event data corresponding to first attribute information and second attribute information which is different from the first attribute information, time series information with which a time series order of the event data is identifiable, the first attribute information, and the second attribute information, and temporarily accumulating the data block in a first temporary memory; acquiring the data block, and temporarily accumulating the data block in a second temporary memory; sorting, by the first attribute information, a plurality of data blocks accumulated in the first temporary memory, and storing the sorted data blocks in a first memory; and soring, by the second attribute information, a plurality of data blocks accumulated in the second temporary memory, and storing the sorted data blocks in a second memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an exemplary write request of the second embodiment;
FIG. 6 illustrates an exemplary search request of the second embodiment;
FIG. 7 illustrates an exemplary read request of the second embodiment;
FIG. 9 illustrates an example of server information of the second embodiment.

DESCRIPTION OF EMBODIMENTS

Figure 1:
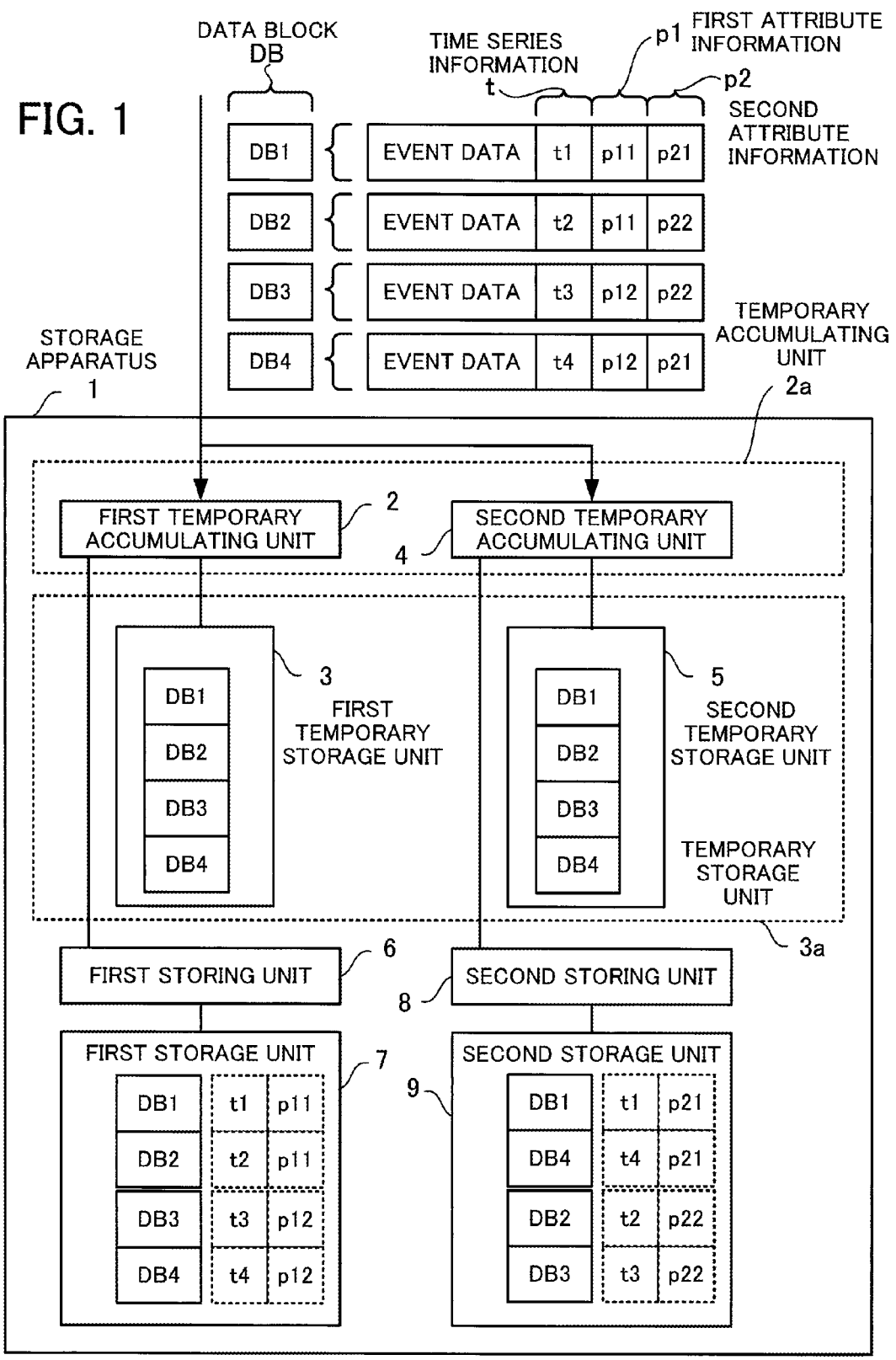
FIG. 1 illustrates an exemplary configuration of a storage apparatus according to a first embodiment.

Several embodiments will be described below with reference to the accompanying drawings, wherein like reference numerals refer to like elements throughout.

First Embodiment

First, a storage apparatus according to a first embodiment will be described, referring to FIG. 1. FIG. 1 illustrates an exemplary configuration of a storage apparatus of the first embodiment.

A storage apparatus 1 stores data arriving in a time series order, in a storage unit. The data arriving in a time series order is data on which continuous reception processing and write processing need to be performed, such as capture data of communication packets or log data of communication logs. The storage unit is a storage device capable of storing data, such as an HDD (Hard Disk Drive) or a tape device.

The storage apparatus 1 includes a first temporary accumulating unit 2, a second temporary accumulating unit 4, a first storing unit 6, and a second storing unit 8. The storage apparatus 1 acquires a data block DB. The data block DB includes event data, time series information t, first attribute information p1, and second attribute information p2. The data block DB is generated by another information processing apparatus based on, for example, data collected by another unillustrated information processing apparatus, or data generated by another unillustrated information processing apparatus. The storage apparatus 1 acquires the data block DB from another information processing apparatus.

Event data is composed of data collected by another unillustrated information processing apparatus, or data generated by another unillustrated information processing apparatus. The data composition mentioned here includes changes to a specified format such as blocking of data.

The time series information t is information with which a time series order of event data, i.e., a temporal relation between data sets is identifiable. The time series information t may be a time point relating to data such as generation time, occurrence time, transmission time, reception time of data, or may be a sequential number.

Each of the first attribute information p1 and the second attribute information p2 is information indicating an attribute of event data. The first attribute information p1 and the second attribute information p2 include, for example, transmission sources or destinations of data, communication protocols, or the like.

The first temporary accumulating unit 2 acquires the data block DB. The first temporary accumulating unit 2 temporarily accumulates the acquired data block DB in a first temporary storage unit 3. The first temporary storage unit 3 is a buffer configured to temporarily store the data block DB, and is a RAM (Random Access Memory), for example.

The second temporary accumulating unit 4 acquires the data block DB. The second temporary accumulating unit 4 temporarily accumulates the acquired data block DB in a second temporary storage unit 5. The second temporary storage unit 5 is a buffer configured to temporarily store the data block DB, and is a RAM, for example.

The first storing unit 6 sorts a plurality of data blocks DB accumulated in the first temporary storage unit 3, by the first attribute information p1 and in a time series order identified from the time series information t, and stores the sorted data blocks DB in a first storage unit 7. The first storage unit 7 is one of the storage units, and is a storage device such as an HDD or a tape device.

The second storing unit 8 sorts a plurality of data blocks DB accumulated in the second temporary storage unit 5, by the second attribute information p2 and in a time series order identified from the time series information t, and stores the sorted data blocks DB in a second storage unit 9. The second storage unit 9 is one of the storage units, and is a storage device such as an HDD or a tape device.

Here, the flow of storing the data block DB acquired by the storage apparatus 1 in the storage unit is described, using the data blocks DB1, DB2, DB3 and DB4. The data blocks DB acquired by the storage apparatus 1 include, in a time series order from the oldest data block, the data block DB1, the data block DB2, the data block DB3, and the data block DB4. The data block DB1 includes a set of event data, time series information t1, first attribute information p11, and second attribute information p21. The data block DB2 includes event data, time series information t2, first attribute information p11, and second attribute information p22. The data block DB3 includes event data, time series information t3, the first attribute information p12, and second attribute information p22. The data block DB4 includes event data, time series information t4, first attribute information p12, and second attribute information p21.

The first temporary accumulating unit 2 accumulates the data blocks DB in the first temporary storage unit 3 in the order of acquisition. Therefore, the first temporary storage unit 3 accumulates the data block DB1, the data block DB2, the data block DB3, and the data block DB4 in a time series order from the oldest data block.

The second temporary accumulating unit 4 accumulates the data blocks DB in the second temporary storage unit 5 in the order of acquisition. Therefore, the second temporary storage unit 5 accumulates the data block DB1, the data block DB2, the data block DB3, and the data block DB4 in a time series order from the oldest data block.

The first storing unit 6 sorts the data blocks DB1, DB2, DB3 and DB4 by the first attribute information p1. Furthermore, the first storing unit 6 sorts, in a time series order identified from the time series information t, each of the data blocks DB which have been sorted by the first attribute information p1, and stores the sorted data blocks in the first storage unit 7. In other words, with the data blocks DB1 and DB2 both containing the first attribute information p11, the first storing unit 6 stores the data blocks DB1 and DB2 in a time series order (the order of the time series information t1 and t2) in the first storage unit 7. In addition, with the data blocks DB3 and DB4 both containing the first attribute information p12, the first storing unit 6 stores the data blocks DB3 and DB4 in a time series order (the order of the time series information t3 and t4) in the first storage unit 7. Accordingly, the first storage unit 7 stores the data blocks DB in the order of the data blocks DB1, DB2, DB3 and DB4.

The second storing unit 8 sorts the data blocks DB1, DB2, DB3 and DB4 by the second attribute information p2. Furthermore, the second storing unit 8 sorts the data blocks, for each of the data blocks DB which has been sorted by the second attribute information p2 and in a time series order identified from the time series information t, and stores the sorted data blocks in the second storage unit 9. In other words, with the data blocks DB1 and DB4 both containing the second attribute information p21, the second storing unit 8 stores the data blocks DB1 and DB4 in a time series order (the order of the time series information t1 and t4) in the second storage unit 9. In addition, with the data blocks DB2 and DB3 both containing the second attribute information p22, the second storing unit 8 stores the data blocks DB2 and DB3 in a time series order (the order of the time series information t2 and t3) in the second storage unit 9. Accordingly, the second storage unit 9 stores the data blocks DB in the order of the data blocks DB1, DB4, DB2 and DB3.

Accordingly, the storage apparatus 1 may store, in a storage unit (first storage unit 7), data arranged by the first attribute information p1 and in a time series order. In addition, the storage apparatus 1 may store, in a storage unit (second storage unit 9), data arranged by the second attribute information p2 and in a time series order.

Therefore, the storage apparatus 1 may perform sequential reading in response to data access in a time series order for the data blocks DB each having the first attribute information p1. In addition, the storage apparatus 1 may perform sequential reading in response to data access in a time series order for the data blocks DB each having the second attribute information p2.

The storage apparatus 1 as described above may reduce the read load with respect to the storage unit and therefore may suppress degradation of write performance due to competition between write and read accesses.

Although the storage apparatus 1 has been described as having the first temporary accumulating unit 2 and the second temporary accumulating unit 4 separately, the first temporary accumulating unit 2 may also play a role of the second temporary accumulating unit 4 as a temporary accumulating unit 2a.

In addition, although the storage apparatus 1 has been described as having the first temporary storage unit 3 and the second temporary storage unit 5 separately, the first temporary storage unit 3 may also play a role of the second temporary storage unit 5 as a temporary storage unit 3a.

Second Embodiment

Figure 2:
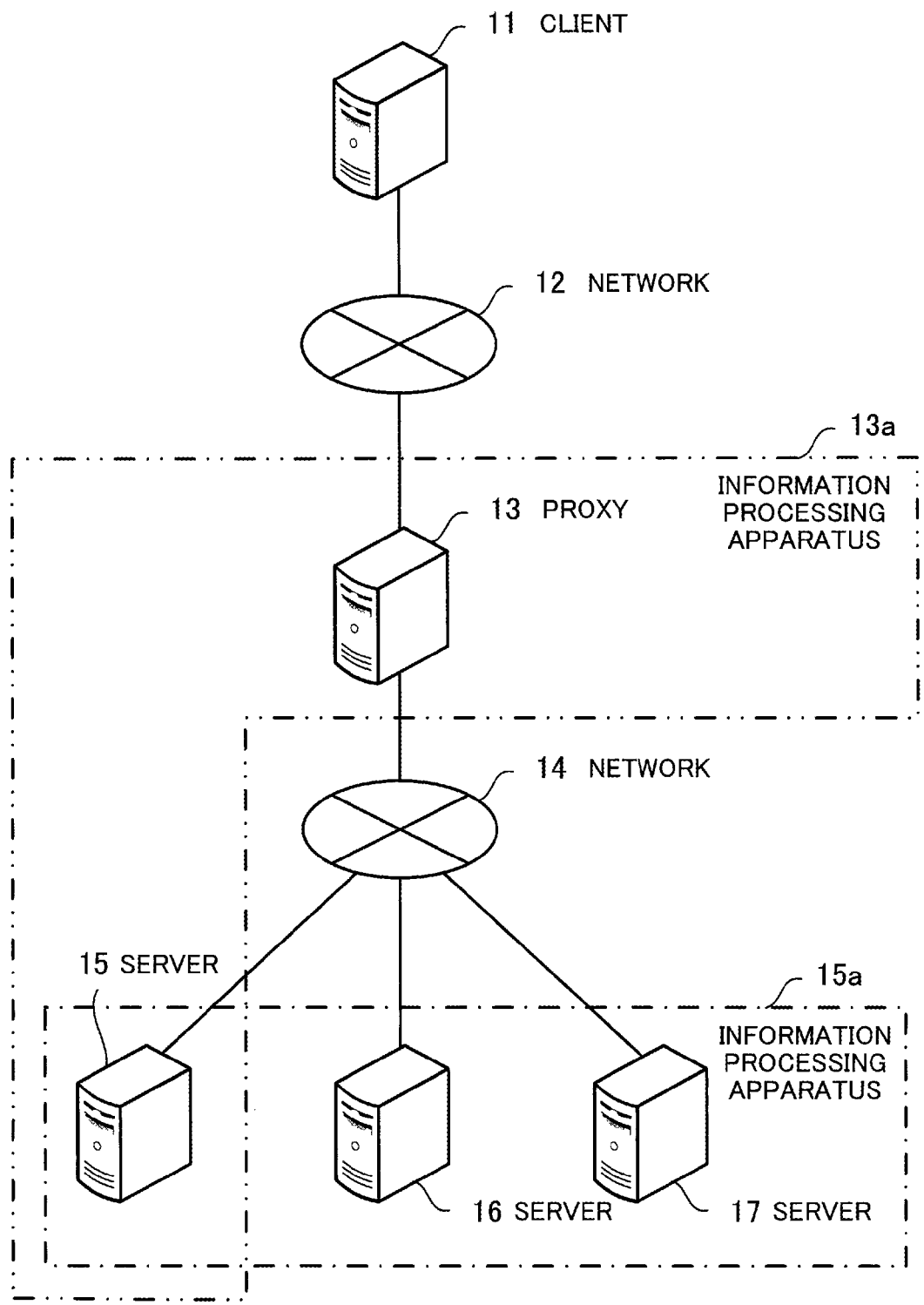
FIG. 2 illustrates an exemplary configuration of a storage system according to a second embodiment.

Next, a configuration of a storage system according to a second embodiment will be described, referring to FIG. 2. FIG. 2 illustrates an exemplary configuration of the storage system of the second embodiment.

A storage system 10 is a packet capturing system configured to capture packets flowing through a communication network (e.g., IP (Internet Protocol) network). Note that the packet capturing system is an example of a storage system configured to accumulate data in a time series order, and is not limited thereto provided that data are accumulated in a storage device in a time series order.

The storage system 10 includes a client 11, networks 12 and 14, a proxy 13, and servers 15, 16 and 17. The storage system 10 stores, in the servers 15, 16 and 17 via the proxy 13, stream data received by the client 11. The stream data are made redundant (mirrored) and stored in two or more of the servers 15, 16 and 17 in order to ensure reliability. Although there are three servers 15, 16 and 17 illustrated in FIG. 2, any number of servers will do provided that there are two or more.

Stream data are sets of data which arrive in a time series order, and on which continuous reception processing and write processing need to be performed, such as capture data of communication packets, for example.

The client 11 is connected to the proxy 13 via the network 12. The proxy 13 is connected to the servers 15, 16 and 17 via the network 14. The client 11 generates a write request from stream data and transmits the write request to the proxy 13. The proxy 13 receives the write request and distributes the write request to two or more servers among the servers 15, 16 and 17. The servers 15, 16 and 17 store the data which is the target of the write request in a built-in storage device or an externally connected storage device. Therefore, the storage system 10 has two or more servers storing identical stream data.

The storage system 10 is not limited to one having the servers 15, 16 and 17 provided on separate information processing apparatuses, and may have the servers 15, 16 and 17 provided on a single information processing apparatus 15a. In addition, the storage system 10 may have at least one of the servers 15, 16 and 17, and the proxy 13 provided on a single information processing apparatus 13a.

Figure 3:
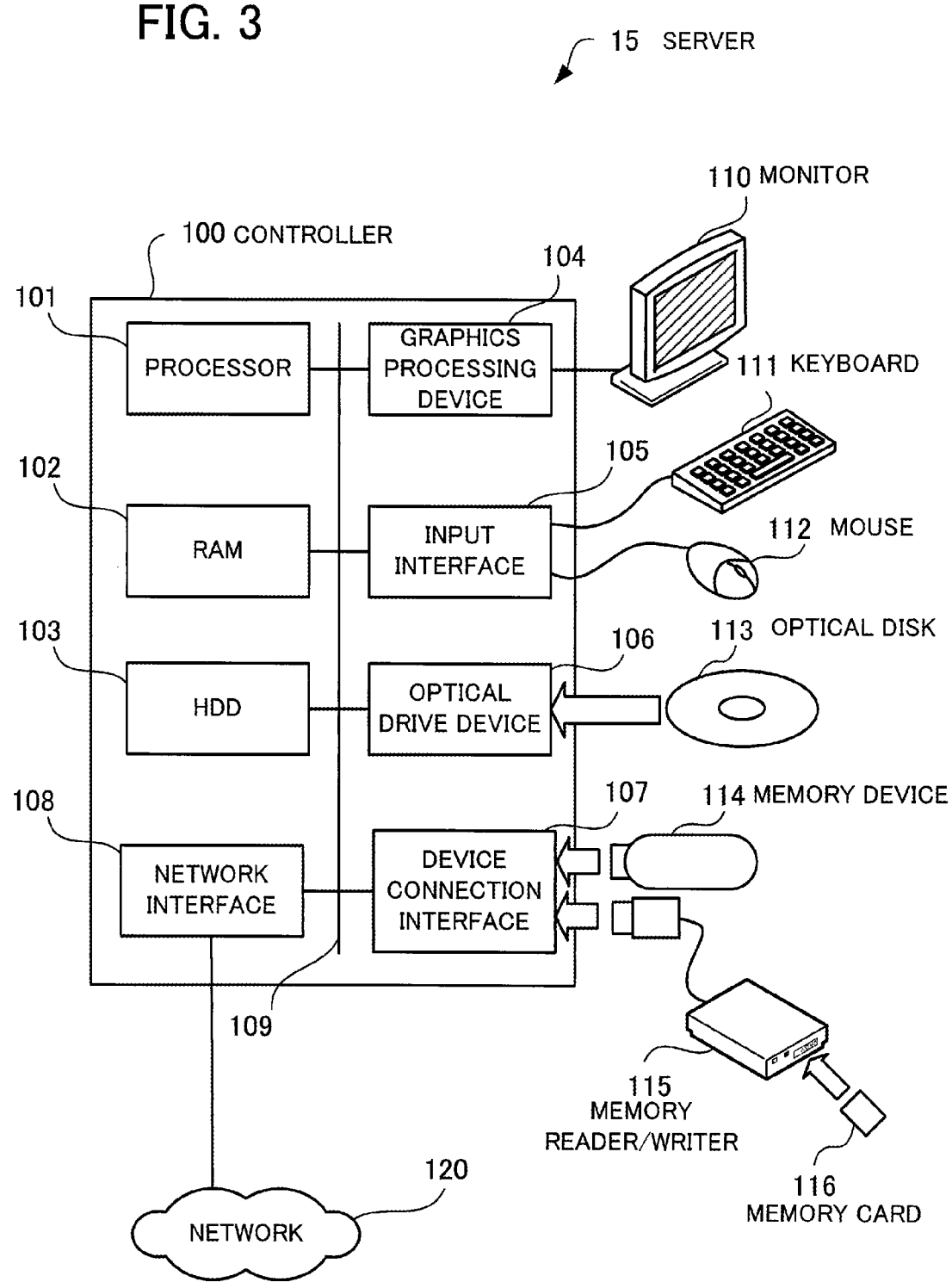
FIG. 3 illustrates an exemplary hardware configuration of a client of the second embodiment.

Next, a hardware configuration of the client 11 of the second embodiment will be described, referring to FIG. 3. FIG. 3 illustrates an exemplary hardware configuration of a client of the second embodiment.

The client 11 includes a controller (computer) 100 and a plurality of peripheral devices connected to the controller 100. The controller 100 is controlled in its entirety by a processor 101. The processor 101 has a RAM 102 and a plurality of peripheral devices connected thereto via a bus 109. The processor 101 may be a multiprocessor. The processor 101 is, for example, a CPU (Central Processing Unit), an MPU (Micro Processing Unit), a DSP (Digital Signal Processor), an ASIC (Application Specific Integrated Circuit), or a PLD (Programmable Logic Device). In addition, the processor 101 may be a combination of two or more elements of a CPU, an MPU, a DSP, an ASIC, and a PLD.

The RAM 102 is used as a main storage apparatus of the controller 100. At least a part of programs of the OS (Operating System) or application programs to be executed by the processor 101 are temporarily stored in the RAM 102. In addition, various data needed for processing by the processor 101 are stored in the RAM 102.

An HDD 103, a graphics processing device 104, an input interface 105, an optical drive device 106, a device connection interface 107, and a network interface 108 may be used as peripheral devices connected to the bus 109.

The HDD 103 magnetically writes and reads data to and from a built-in disk. The HDD 103 is used as an auxiliary storage apparatus of the controller 100. The HDD 103 has stored therein programs of the OS, application programs, and various data. A semiconductor storage apparatus such as a flash memory may be used as an auxiliary storage apparatus.

The graphics processing device 104 has a monitor 110 connected thereto. The graphics processing device 104 displays images on the screen of the monitor 110 according to instructions from the processor 101.

The input interface 105 has a keyboard 111 and a mouse 112 connected thereto. The input interface 105 transmits, to the processor 101, signals sent from the keyboard 111 and the mouse 112. The mouse 112 is an exemplary pointing device, and other pointing devices may be used. A touch panel, a tablet, a touch-pad, a track ball, or the like may be used as other pointing devices.

The optical drive device 106 reads data stored in the optical disk 113 using laser beam or the like. The optical disk 113 is a portable storage medium having data stored thereon so as to be readable by reflection of light. A DVD (Digital Versatile Disc), a DVD-RAM, a CD-ROM (Compact Disc Read Only Memory), a CD-R (Recordable)/RW (ReWritable), or the like, may be used as the optical disk 113.

The device connection interface 107 is a communication interface for connecting peripheral devices to the controller 100. For example, the device connection interface 107 may have a memory device 114, or a memory reader/writer 115 connected thereto. The memory device 114 is a storage medium having installed thereon a communication function with the device connection interface 107. The memory reader/writer 115 is a device configured to write data to a memory card 116 or read data from the memory card 116. The memory card 116 is a card-type storage medium.

The network interface 108 is connected to the network 12. The network interface 108 transmits and receives data to or from other computers or communication devices via the network 12.

According to the hardware configuration described above, the processing function of the controller 100 of the second embodiment may be realized. The proxy 13, the servers 15, 16 and 17, and the storage apparatus 1 illustrated in the first embodiment may be realized by a hardware configuration similar to that of the client 11 illustrated in FIG. 3.

The controller 100 realizes the processing function of the second embodiment by executing programs stored in a computer-readable storage medium, for example. A program having described therein details of the processing to be performed by the controller 100 may be stored in a variety of storage media. For example, a program to be executed by the controller 100 may be stored in the HDD 103. The processor 101 loads, to the RAM 102, at least a part of a program stored in the HDD 103 and executes the program. In addition, a program to be executed by the controller 100 may also be stored in a portable storage medium such as the optical disk 113, the memory device 114, the memory card 116, or the like. A program stored in a portable storage medium may be installed in the HDD 103 by control from the processor 101, for example, and thereafter becomes executable. In addition, the processor 101 may also read a program directly from a portable storage medium and execute the program.

Figure 4:
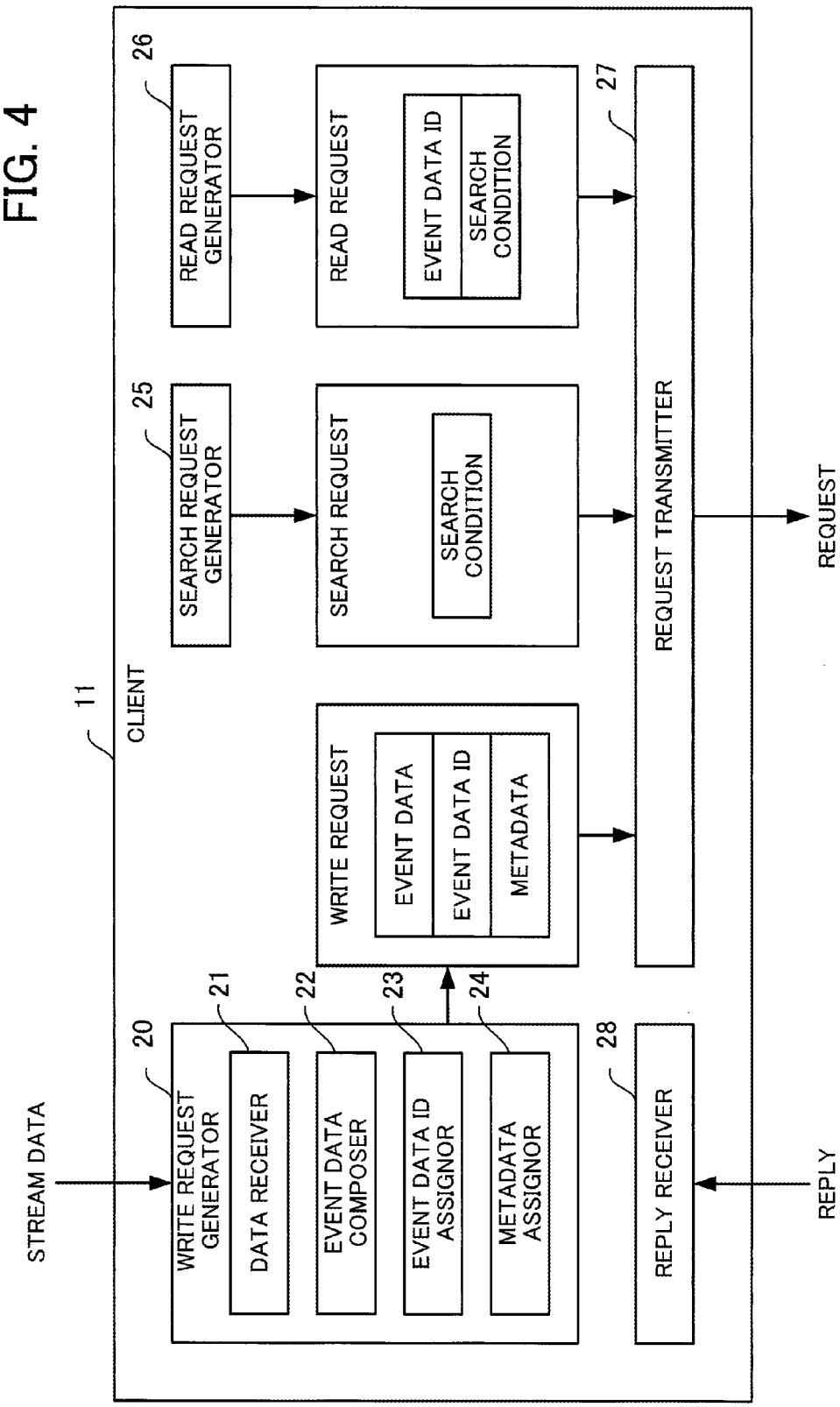
FIG. 4 illustrates an exemplary functional block configuration of a client of the second embodiment.

Next, a functional block configuration of the client 11 of the second embodiment will be described, referring to FIG. 4. FIG. 4 illustrates an exemplary functional block configuration of a client of the second embodiment.

The client 11 receives stream data in the storage system 10. The client 11 transmits a write request, a search request, and a read request to the proxy 13. The client 11 receives a reply in response to the write request, the search request, and the read request.

The client 11 includes a write request generator 20, a search request generator 25, a read request generator 26, a request transmitter 27, and a reply receiver 28.

The write request generator 20 receives stream data and generates a write request. The write request generator 20 includes a data receiver 21, an event data composer 22, an event data ID assignor 23, and a metadata assignor 24.

The data receiver 21 receives stream data. For example, the data receiver 21 connects to a mirror port of a switch, and acquires packets flowing through the switch as stream data.

The event data composer 22 composes event data from the stream data received by the data receiver 21. Event data is a mass of data having a specified attribute. In the case of a packet capturing system, for example, stream data is a series of packets flowing through an IP network. Event data results from extracting, from the stream data, packets flowing through a particular TCP (Transmission Control Protocol) connection. In this case, a transmission source IP address, a transmission destination IP address, a protocol, or the like, corresponds to the specified attribute.

The event data ID assignor 23 assigns identification information, with which event data composed by the event data composer 22 is uniquely identifiable, to the event data as an event data ID (IDentification).

The metadata assignor 24 assigns an event data attribute to the event data as metadata. Accordingly, the write request generator 20 may generate a write request including the event data, event data ID, and metadata. The write request generated by the write request generator 20 is transmitted to the proxy 13 by the request transmitter 27. A reply to the write request is received from the proxy 13 by the reply receiver 28.

The search request generator 25 generates a search request including a search condition. The search request generated by the search request generator 25 is transmitted to the proxy 13 by the request transmitter 27. A reply to the search request is received from the proxy 13 by the reply receiver 28. The reply to the search request includes an event data ID which is the search result based on the search condition.

The read request generator 26 generates a read request including the search condition specified in the search request, and the event data ID included in the reply to the search request. The read request generated by the read request generator 26 is transmitted to the proxy 13 by the request transmitter 27. A reply to the read request is received from the proxy 13 by the reply receiver 28.

Next, a write request of the second embodiment will be described, referring to FIG. 5. FIG. 5 illustrates an exemplary write request of the second embodiment.

A write request 200 includes an event data ID, metadata, and event data. The event data ID is "1". The metadata includes a transmission source IP address, a transmission destination IP address, a communication protocol, and a start time. The transmission source IP address is "192.168.0.1", the transmission destination IP address is "192.168.100.100", the communication protocol is "TCP", and the start time is "2013/09/30/12:00". The event data is data to be stored in the storage device, such as packet capture data, for example.

Next, a search request of the second embodiment will be described, referring to FIG. 6. FIG. 6 illustrates an exemplary search request of the second embodiment.

A search request 210 includes a search condition. The search condition may have one or two or more search items specified therein, and the search items may be specified for each attribute included in the metadata. The search request 210 includes, as search items, a transmission source IP address, a transmission destination IP address, a communication protocol, and a start time. The transmission source IP address is "192.168.0.1", the transmission destination IP address is "*", the communication protocol is "*", and the start time is "2013/09/30/12:00-2013/09/30/13:00". Here, "*" represents a wild card.

Next, a read request of the second embodiment will be described, referring to FIG. 7. FIG. 7 illustrates an exemplary read request of the second embodiment.

A read request 220 includes an event data ID and a search condition. The read request 220 may have specified therein event data IDs being a part or all of event data IDs included in a reply to the search request 210. The event data ID is "3, 5". The search condition included in the read request 220 is the search condition used to acquire the event data ID, i.e., the search condition included in the search request.

Figure 8:
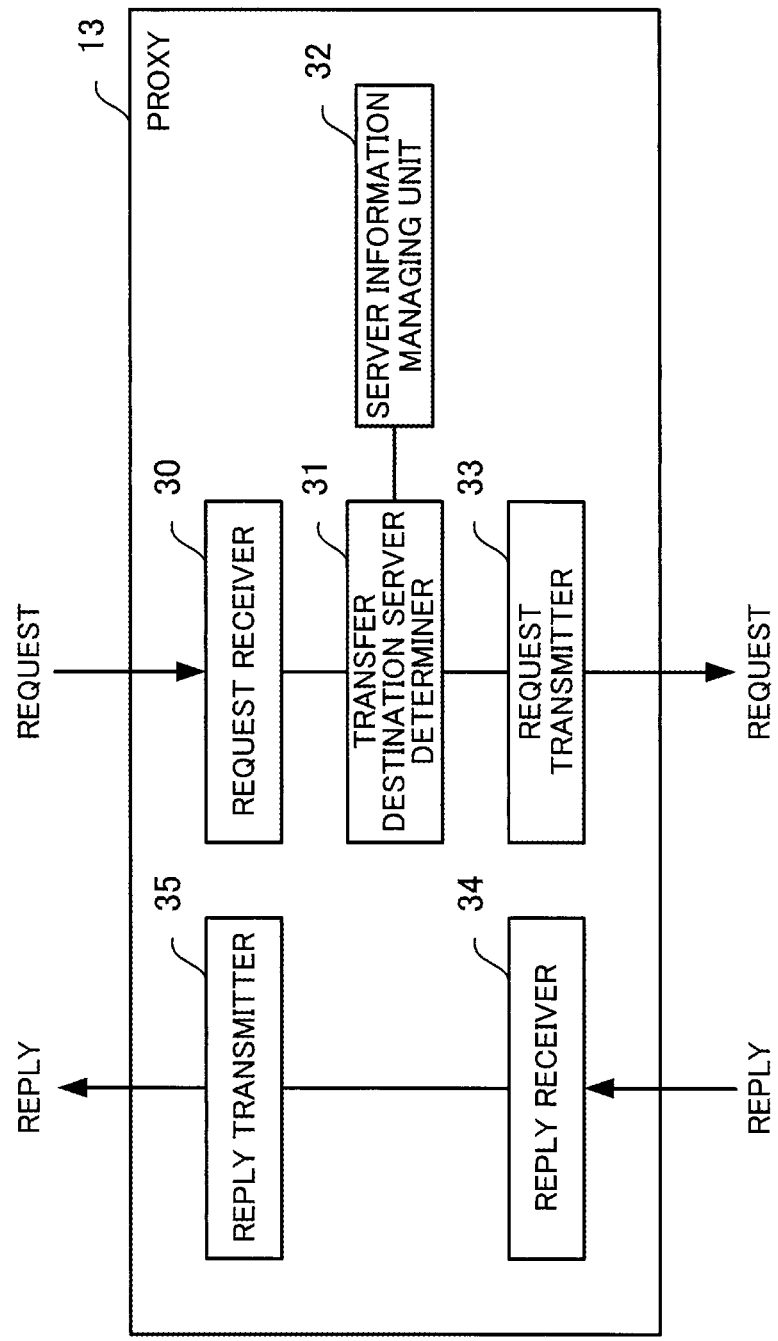
FIG. 8 illustrates an exemplary functional block configuration of a proxy of the second embodiment.

Next, a functional block configuration of the proxy 13 of the second embodiment will be described, referring to FIG. 8. FIG. 8 illustrates an exemplary functional block configuration of the proxy of the second embodiment.

The proxy 13 receives requests (write requests, search requests, read requests) from the client 11, and transmits the received requests to the servers 15, 16 and in a distributed manner. In addition, the proxy 13 receives replies from the servers 15, 16 and 17, and transmits them to the client 11.

The proxy 13 includes a request receiver 30, a transfer destination server determiner 31, a server information managing unit 32, a request transmitter 33, a reply receiver 34, and a reply transmitter 35.

The request receiver 30 receives a request from the client 11. The transfer destination server determiner determines the transfer destination of the request received from the client 11. When the request received from the client 11 is a write request, the transfer destination server determiner 31 determines all the servers 15, 16 and 17 to be mirrored as the transfer destinations of the write request.

When the request received from the client 11 is a search request, the transfer destination server determiner 31 determines one of the servers 15, 16 and 17 as the transfer destination of the search request. The transfer destination server determiner 31 may determine the transfer destination of the search request in a round robin manner, or may determine the transfer destination of the search request at random. In addition, the transfer destination server determiner 31 may detect the loads of the servers 15, 16 and 17, and then determine the transfer destination of the search request according to the size of the load.

When the request received from the client 11 is a read request, the transfer destination server determiner 31 determines one of the servers 15, 16 and 17 as the transfer destination of the read request, based on the server information managed by the server information managing unit 32. Server information is information indicating the relation between the sort key used for sorting event data when the server accumulates (stores) the event data in the storage device and the server.

The request transmitter 33 transmits the request received from the client 11 to the server, according to the transfer destination determined by the transfer destination server determiner 31.

The reply receiver 34 receives a reply from the server which has transmitted a request. The reply transmitter 35 transmits the reply received by the reply receiver 34 to the client 11.

The request receiver 30, the transfer destination server determiner 31, the server information managing unit 32, and the request transmitter 33 function as a read request transfer unit which transfers read requests. In addition, the request receiver 30, the transfer destination server determiner 31, and the request transmitter 33 function as a search request transfer unit which transfers search requests. In addition, the request receiver 30, the transfer destination server determiner 31, and the request transmitter 33 function as a write request transfer unit which transfers write requests.

Next, server information of the second embodiment will be described, referring to FIG. 9. FIG. 9 illustrates an example of server information of the second embodiment.

Server information 230 is information managed by the server information managing unit 32 of the proxy 13. The server information 230 indicates a correspondence relation between a server ID and a sort key. A server ID is information with which a server is uniquely identifiable. A sort key is an item used by a server for sorting event data. A different item is set as the sort key for each server performing mirroring of event data. For example, a server ID "#1" makes the server 15 identifiable. The sort key "transmission source IP address" indicates that the server sorts event data by the transmission source IP address. Therefore, the server 15 identified by the server ID "#1" sorts event data by the transmission source IP address. Similarly, the server 16 identified by the server ID "#2" sorts event data by the transmission destination IP address, and the server 17 identified by the server ID "#3" sorts event data by the communication protocol.

Figure 10:
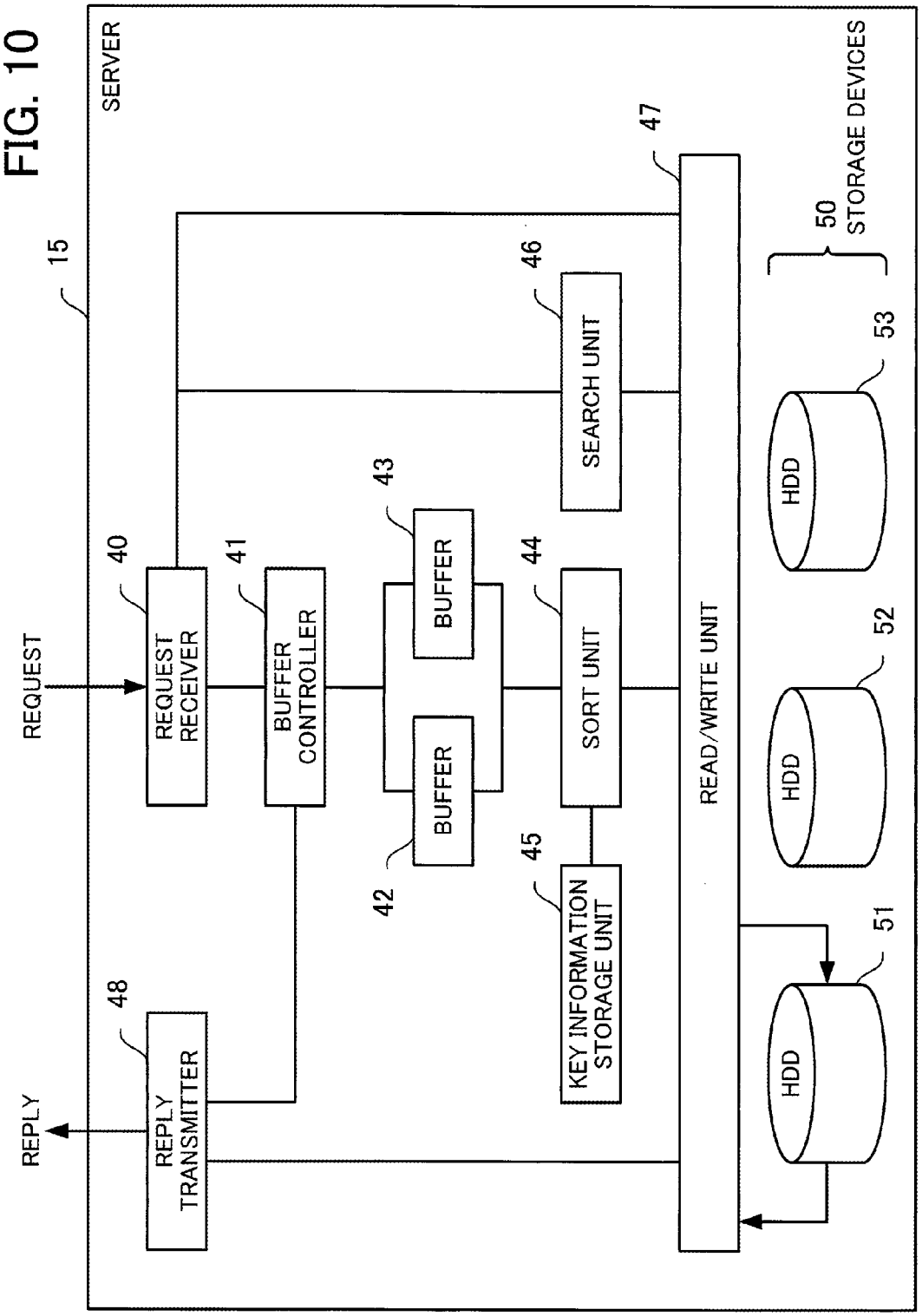
FIG. 10 illustrates an exemplary functional block configuration of a server of the second embodiment.

Next, functional block configurations of the servers 15, 16 and 17 of the second embodiment will be described, referring to FIG. 10. FIG. 10 illustrates an exemplary functional block configuration of the server of the second embodiment. Although description will be given of the server 15 referring to FIG. 10, the same goes for the servers 16 and 17, as with the server 15.

The server 15 receives a request (write request, search request, read request) from the proxy 13, and transmits a reply to the proxy 13 in response to the received request.

The server 15 includes a request receiver 40, a buffer controller 41, buffers 42 and 43, a sort unit 44, a key information storage unit 45, a search unit 46, a read/write unit 47, a reply transmitter 48, and storage devices 50.

The request receiver 40 receives a request from the proxy 13. When the request receiver 40 receives a write request, the buffer controller 41 stores event data in either the buffer 42 or 43. The reply transmitter 48 transmits a reply to the write request, to the proxy 13.

Before the buffer being the storage destination of event data (write buffer) overflows, the buffer controller 41 switches the storage destination of event data to the other buffer (sort buffer) which is empty. The buffers 42 and 43 are provided in the RAM 102 or the like which allows faster access than the storage devices 50.

The sort unit 44 selects, as the target of sorting, the buffer which has been excluded from the storage destination of event data due to switching of buffers. For example, when the buffer controller 41 has switched the storage destination of event data from the buffer 42 to the buffer 43, the sort unit 44 selects the buffer 42 as the target of sorting.

The sort unit 44 uses the sort key stored in the key information storage unit 45 to sort the event data stored in the buffer being the target of sorting. The sort key corresponds to the sort key included in the server information managed by the server information managing unit 32 of the proxy 13. The key information storage unit 45 preliminarily receives and stores the sort key from the proxy 13.

When there is a plurality of sets of event data having the same attribute, the sort unit 44 further sorts the data sets in a time series order. The read/write unit 47 writes the event data sorted by the sort unit 44 to the storage devices 50. The storage devices 50 include one or two or more storage devices (storage apparatuses) such as HDDs 51, 52 and 53, for example. The read/write unit 47 selects one of the storage devices (e.g., HDD 51) from the storage devices 50, and writes the sorted event data thereto. Accordingly, sets of event data having the same attribute are sequentially written to the storage device in a time series order.

The sort unit 44 deletes event data from the buffer being the target of sorting and empties the buffer. As thus described, the server 15 writes event data to the storage devices 50 asynchronously with the processing of the write request.

When the request receiver 40 receives a search request, the search unit 46 performs a search according to the search condition, and acquires a search result (e.g., list of event data IDs) via the read/write unit 47. The reply transmitter 48 transmits the search result for the search request as a reply, to the proxy 13.

When the request receiver 40 receives a read request, the read/write unit 47 reads event data and metadata from the storage devices 50, based on the event data ID. The reply transmitter 48 transmits the event data and metadata corresponding to the read request as a reply, to the proxy 13.

When the event data ID included in the read request includes a search condition having the same attribute as the sort key, it is very likely that the event data corresponding to the read request is written in a continuous storage area in the storage devices 50. For example, when event data to be read has been written to the storage devices 50 at the same buffer flush, the event data to be read exists in a single storage area (e.g., same segment in HDD) or in a continuous storage area. Therefore, the read/write unit 47 may sequentially read event data from the storage devices 50. Such a read process applies a small load to the storage devices 50, and may suppress degradation of write performance in write processes being simultaneously performed.

Figure 11:
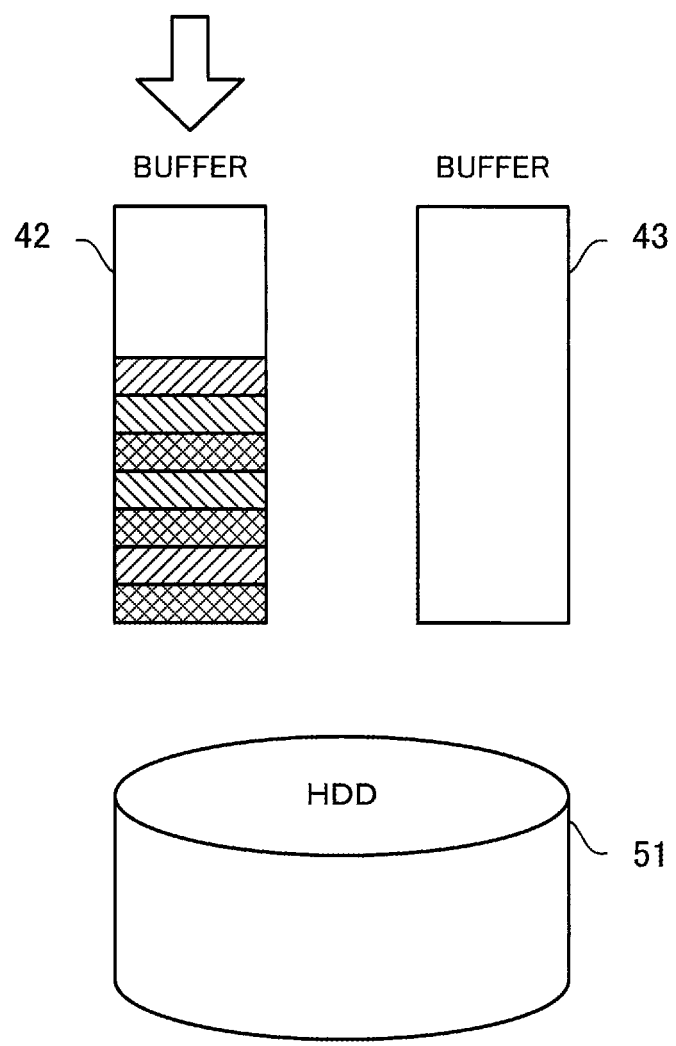
FIG. 11 illustrates an example of accumulating event data in a buffer of the second embodiment.
Figure 12:
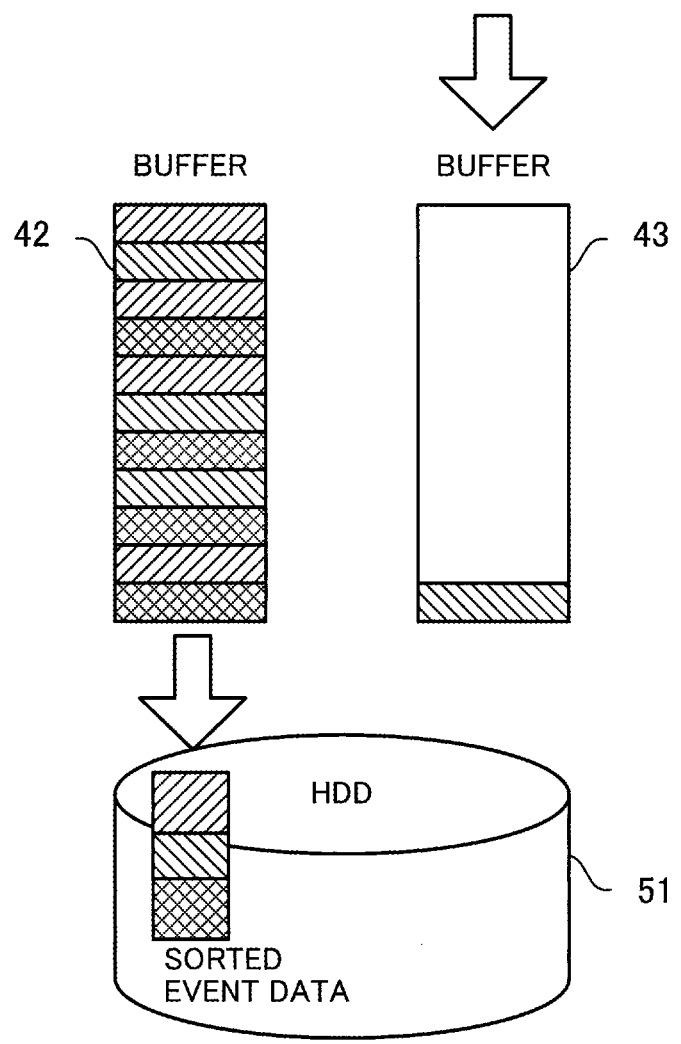
FIG. 12 illustrates an example of switching buffers according to the second embodiment.

Next, accumulation of event data in the buffer and switch of buffers of the second embodiment will be described, referring to FIGS. 11 and 12. First, accumulation of event data in the buffer will be described, referring to FIG. 11. FIG. 11 illustrates an example of accumulating event data in a buffer of the second embodiment.

The buffer controller 41 has selected the buffer 42 as the storage destination of event data corresponding to the write request, and has not selected the buffer 43. The HDD 51 is the storage destination of the buffer-flushed event data.

The blank parts of the buffers 42 and 43 illustrated in FIG. 11 indicate the regions in which event data has not been written. The hatching patterns of the buffer 42 illustrated in FIG. 11 indicate the regions in in which event data has been written. Different hatching patterns indicate different attributes of sets of event data.

The buffer controller 41 writes event data to the buffer 42 each time receiving a write request. Therefore, the buffer 42 arranges sets of event data of different attributes at random and accumulates them.

Next, switch of the buffer will be described, referring to FIG. 12. FIG. 12 illustrates an example of how buffers are switched in the second embodiment.

Before the buffer 42 overflows, the buffer controller 41 switches the storage destination of event data to the buffer 43 which is empty. The sort unit 44 selects, as the target of sorting, the buffer 42 which has been excluded from the storage destination of event data. The sort unit 44 sorts the event data stored in the buffer 42, and stores the sorted event data in the HDD 51 via the read/write unit 47. In this manner, sets of event data having the same attribute are sequentially written to the HDD 51.

Figure 13:
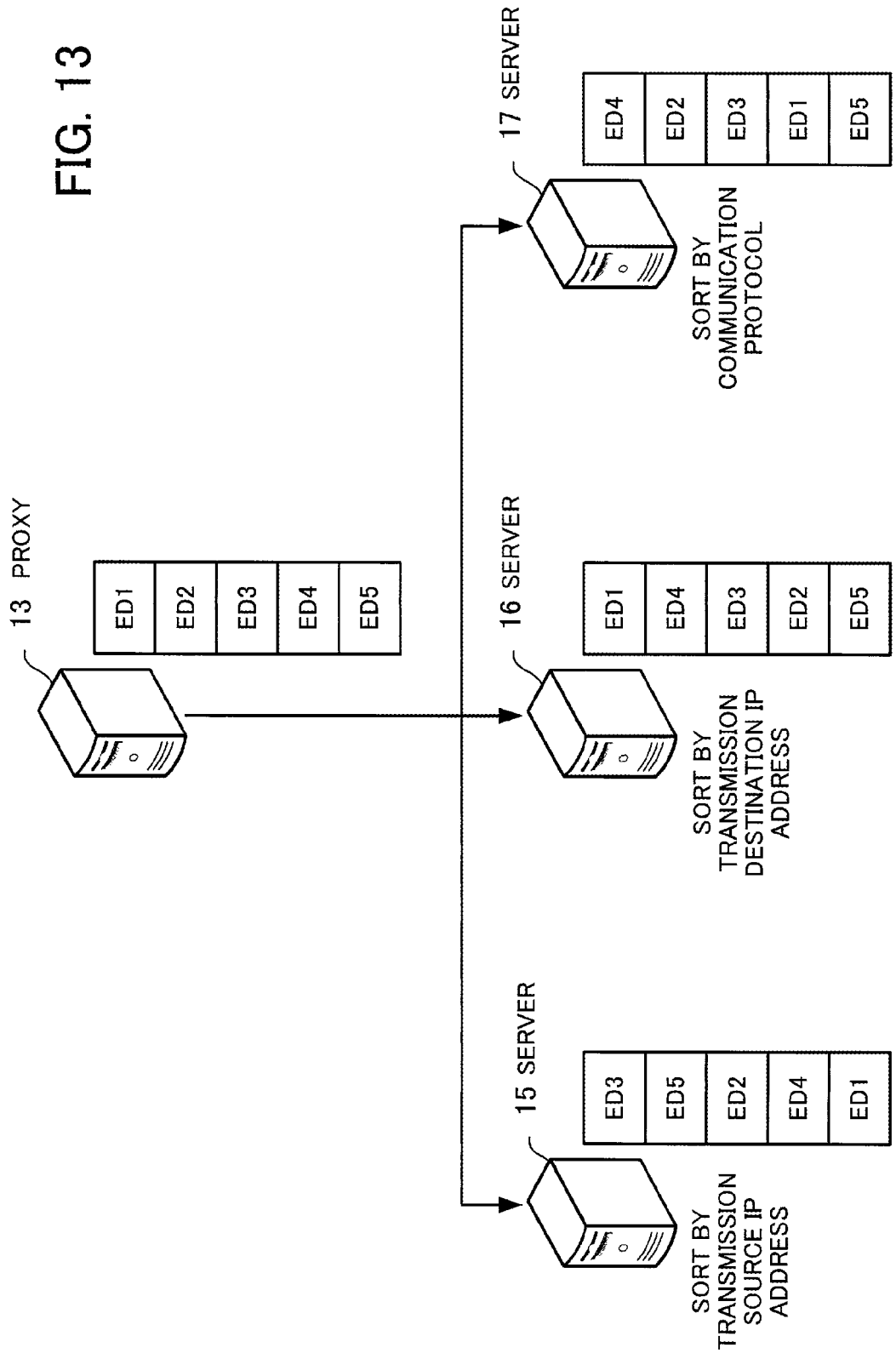
FIG. 13 illustrates an example of the order of occurrence of write requests, and the storage state of event data in each server of the second embodiment.

Next, write requests transferred by the proxy 13 and the storage state of sets of event data for each of the servers 15, 16 and 17 will be described, referring to FIG. 13. FIG. 13 illustrates an example of the order of occurrence of write requests, and the storage state of sets of event data in respective servers of the second embodiment.

The proxy 13 transmits write requests of the event data sets to the servers 15, 16 and 17 in the order of ED1, ED2, ED3, ED4 and ED5. The server 15 sorts the event data sets based on the metadata assigned to the event data, with the transmission source IP address being the sort key. Accordingly, the server 15 stores the event data sets in the order of ED3, ED5, ED2, ED4 and ED1, for example. The server 16 sorts the event data sets based on the metadata assigned to the event data, with the transmission source IP address being the sort key. Accordingly, the server 16 stores the event data sets in the order of ED1, ED4, ED3, ED2 and ED5, for example. The server 17 sorts the event data sets based on the metadata assigned to the event data, with the communication protocol being the sort key. Accordingly, the server 17 stores the event data sets in the order of ED4, ED2, ED3, ED1 and ED5, for example.

Figure 14:
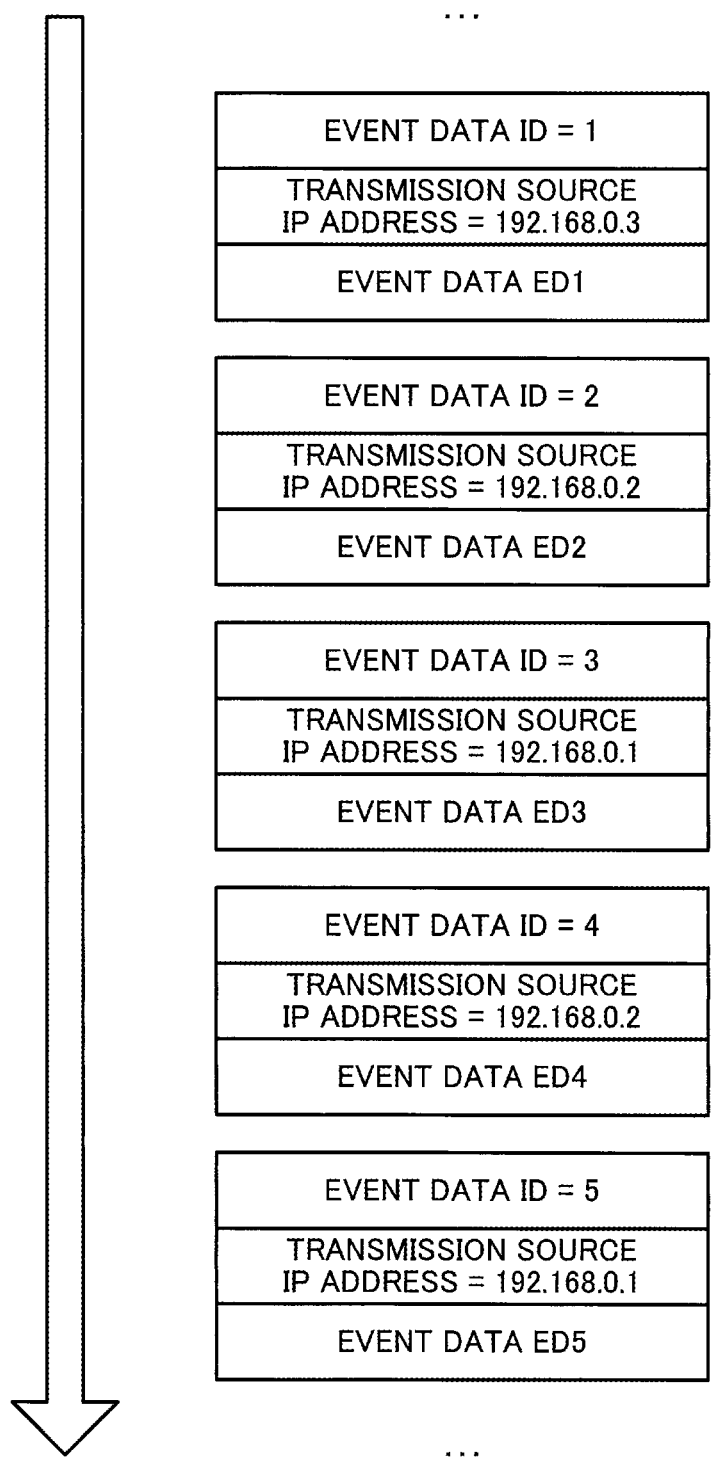
FIG. 14 illustrates exemplary event data included in a write request transferred by a proxy 13.

Here, event data included in a write request transmitted by the proxy 13 will be described, referring to a more specific example illustrated in FIG. 14. FIG. 14 illustrates exemplary event data sets included in the write requests transferred by the proxy 13.

Details of the event data ID and the transmission source IP address will be described for each of the event data sets ED1, ED2, ED3, ED4 and ED5 illustrated in FIG. 13. The event data set ED1 has an event data ID "1" and a transmission source IP address "192.168.0.3". The event data set ED2 has an event data ID "2" and a transmission source IP address "192.168.0.2". The event data set ED3 has an event data ID "3" and a transmission source IP address "192.168.0.1". The event data set ED4 has an event data ID "4" and a transmission source IP address "192.168.0.2". The event data set ED5 has an event data ID "5" and a transmission source IP address "192.168.0.1".

Accordingly, the server 15, which performs sorting according to the transmission source IP address, sorts the event data into three data groups: event data sets ED3 and ED5; event data sets ED2 and ED4; and event data set ED1. Furthermore, the server 15 sorts each data group in a time series order. In this manner, the server 15 stores the event data sets in the order of ED3, ED5, ED2, ED4 and ED1 as illustrated in FIG. 13.

Similarly, the server 16 sorts the event data sets by the transmission destination IP address and stores the event data sets in the order of ED1, ED4, ED3, ED2 and ED5. The server 17 sorts the event data sets by the communication protocol and stores the event data sets in the order of ED4, ED2, ED3, ED1 and ED5.

As thus described, the servers 15, 16 and 17 use different sort keys to sort the event data sets, and therefore the order of storing event data sets differs for each server.

Figure 15:
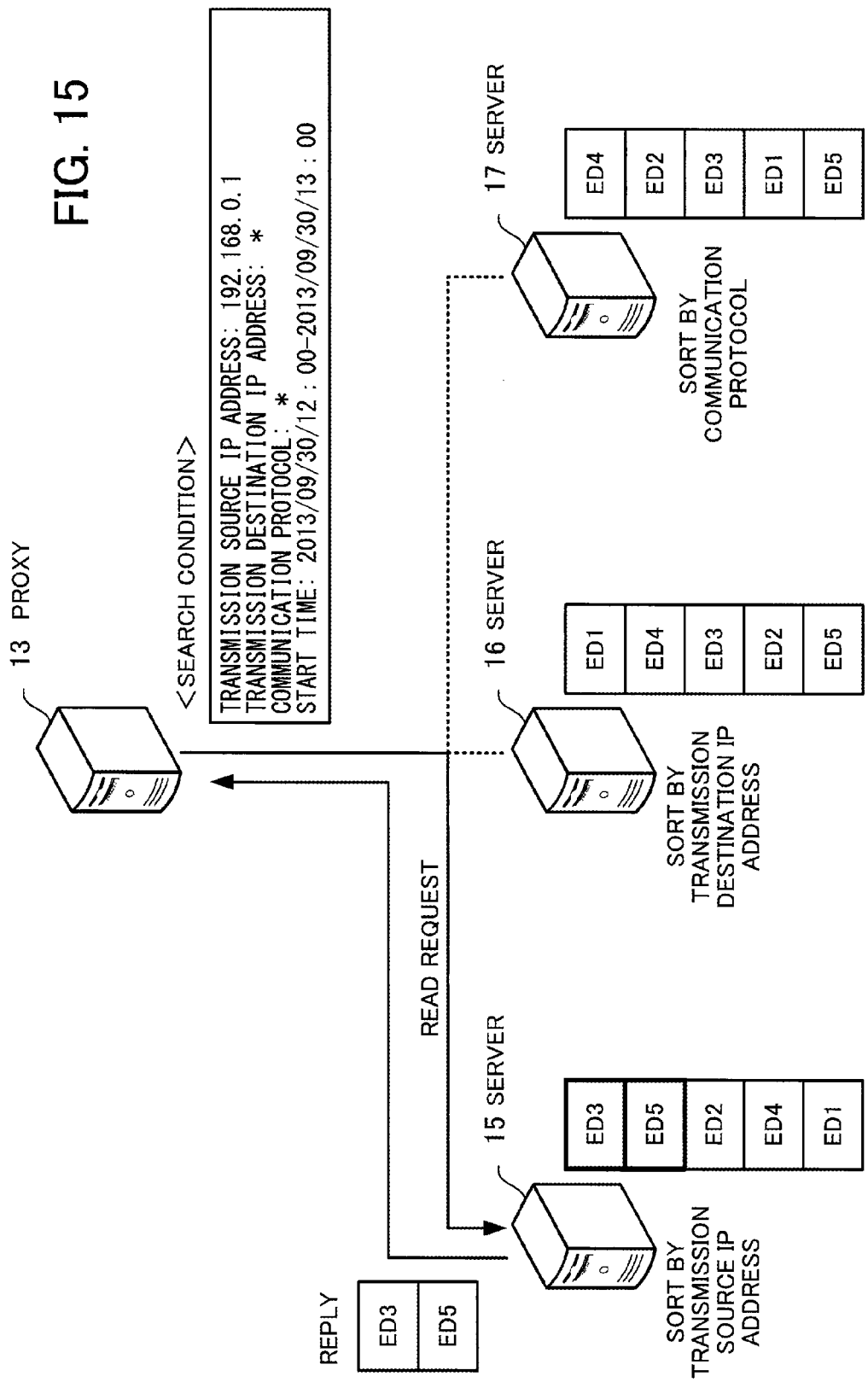
FIG. 15 illustrates an example of a read request and a reply thereto of the second embodiment.

Next, a read request transferred by the proxy and a reply thereto will be described, referring to FIG. 15. FIG. 15 illustrates an example of a read request and a reply thereto of the second embodiment.

The proxy 13 transfers, to the server 15, a read request including an event data ID list "3, 5" and a search condition which has acquired the event data ID list "3, 5" as the search result. The proxy 13 selects the server 15 which performs searching with the transmission source IP address as the sort key, as the transfer destination of the read request, since the search condition has the transmission source IP address as the search item. The server 15 has stored the event data sets ED3 and ED5 in a sequentially readable region, and thus has a smaller load of reading the event data sets ED3 and ED5 than the servers 16 and 17. Upon reading the event data sets ED3 and ED5 from the storage devices 50, the server 15 transmits a reply including the event data sets ED3 and ED5 to the proxy 13. The proxy 13 reduces the read load in the storage system 10 by thus determining the transfer destination of the read request according to the search condition having acquired an event data set to be read as a search result. In addition, the storage system 10 as described above may suppress degradation of write performance due to competition between write and read accesses.

Figure 16:
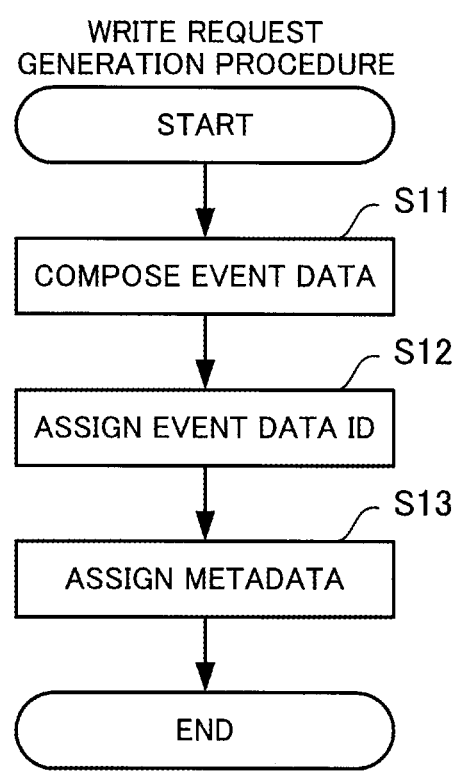
FIG. 16 illustrates a flowchart of a write request generation procedure of the second embodiment.

Next, a write request generation procedure according to the second embodiment will be described, referring to FIG. 16. FIG. 16 illustrates a flowchart of the write request generation procedure of the second embodiment.

The write request generation procedure is a process of generating a write request from received stream data. The write request generation procedure is a process performed by the write request generator 20 of the client 11 upon receiving stream data.

(Step S11) The write request generator 20 composes event data from received data.

(Step S12) The write request generator 20 assigns an event data ID to the event data.

(Step S13) The write request generator 20 assigns metadata to the event data and terminates the write request generation procedure.

Figure 17:
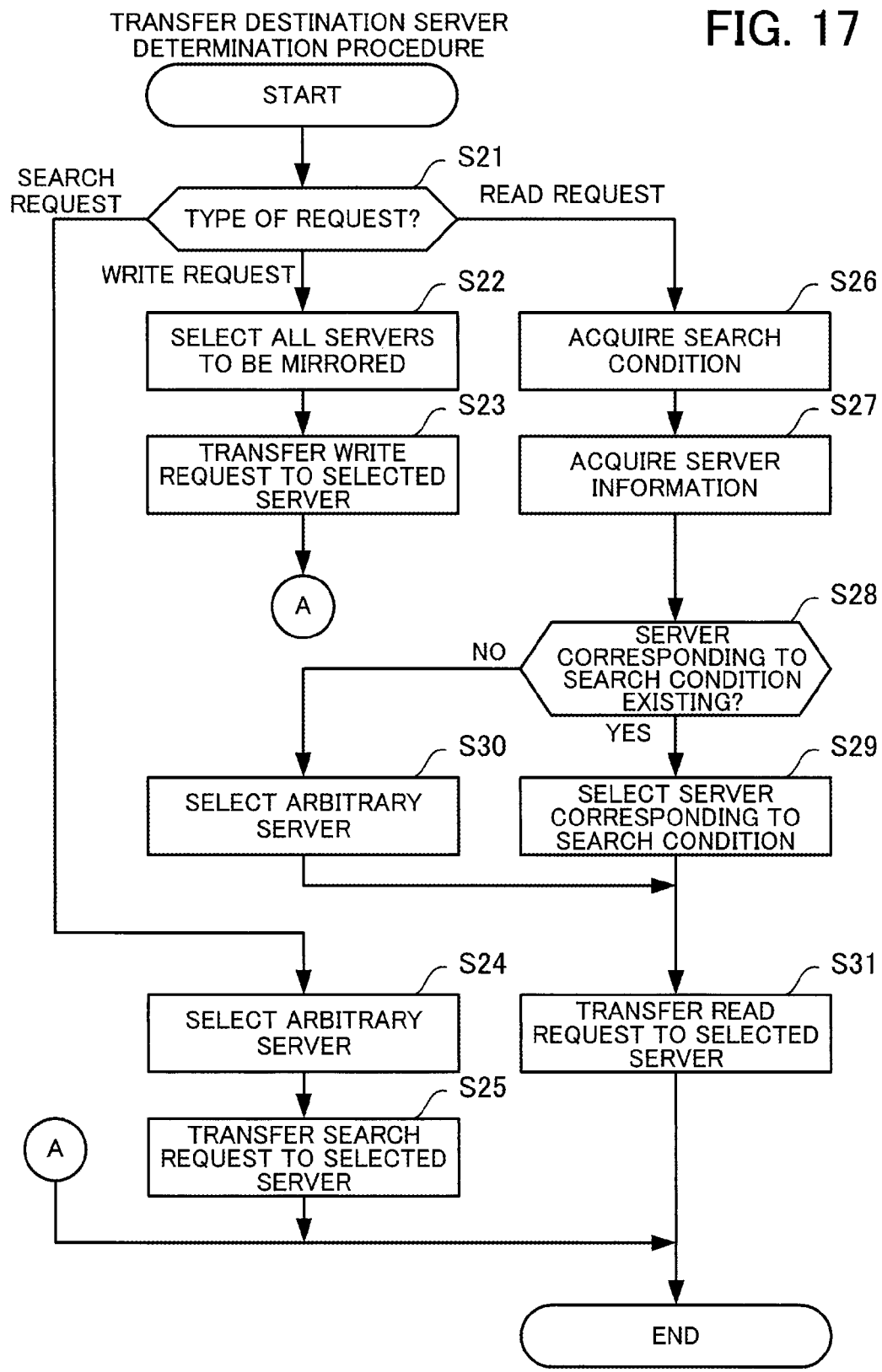
FIG. 17 illustrates a flowchart of a transfer destination server determination procedure of the second embodiment.

Next, a transfer destination server determination procedure of the second embodiment will be described, referring to FIG. 17. FIG. 17 illustrates a flowchart of the transfer destination server determination procedure of the second embodiment.

The transfer destination server determination procedure is a process of determining a transfer destination of a received request. The transfer destination server determination procedure is performed by the transfer destination server determiner 31 upon receiving a request.

(Step S21) The transfer destination server determiner 31 determines the type of the received request. The transfer destination server determiner 31 proceeds to step S22 when the received request is a write request, proceeds to step S24 when it is a search request, or proceeds to step S26 when it is a read request.

(Step S22) The transfer destination server determiner 31 selects all the servers to be mirrored.

(Step S23) The transfer destination server determiner 31 transfers a write request to the selected server, and terminates the transfer destination server determination procedure.

(Step S24) The transfer destination server determiner 31 selects an arbitrary server. The transfer destination server determiner 31 may select a server in a round robin manner or at random, or may select a server according to the load on the server.

(Step S25) The transfer destination server determiner 31 transfers a search request to the selected server, and terminates the transfer destination server determination procedure.

(Step S26) The transfer destination server determiner 31 acquires a search condition included in the read request.

(Step S27) The transfer destination server determiner 31 acquires server information from the server information managing unit 32.

(Step S28) The transfer destination server determiner 31 determines a correspondence relation between the search condition acquired at step S26 and the sort key included in the server information acquired at step S27. The transfer destination server determiner 31 determines that the correspondence relation exists when the search condition and the sort key have the same attribute. When there exists a sort key corresponding to the search condition, the transfer destination server determiner 31 determines whether or not a server corresponding to the sort key exists. When there exists a server corresponding to the sort key, i.e., when there exists a server corresponding to the search condition, the transfer destination server determiner 31 proceeds to step S29, or proceeds to step S30 when there exists no corresponding server.

(Step S29) The transfer destination server determiner 31 selects a server corresponding to the search condition.

(Step S30) The transfer destination server determiner 31 selects an arbitrary server. The transfer destination server determiner 31 may select a server in a round robin manner or at random, or may select a server according to the load of the server.

(Step S31) The transfer destination server determiner 31 transfers a read request to the selected server, and terminates the transfer destination server determination procedure.

Figure 18:
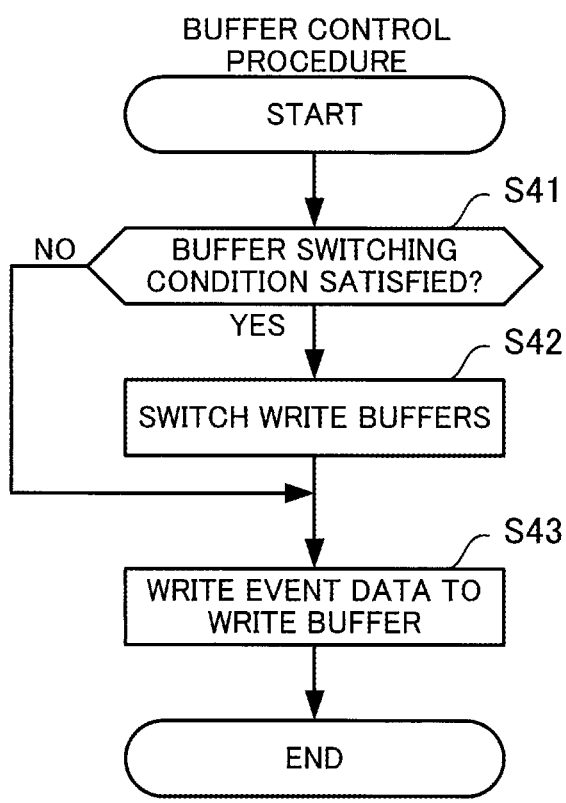
FIG. 18 illustrates a flowchart of a buffer control procedure of the second embodiment.

Next, a buffer control procedure of the second embodiment will be described, referring to FIG. 18. FIG. 18 illustrates a flowchart of the buffer control procedure of the second embodiment.

The buffer control procedure is a process of switching write buffers and writing event data to a write buffer. The buffer control procedure is a process performed by the buffer controller 41 triggered by reception of a write request by the request receiver 40.

(Step S41) The buffer controller 41 determines whether or not a switching condition between the buffers 42 and 43 has been satisfied. The switching condition is such that the free space of a buffer which is the storage destination of event data (write buffer) has become equal to or less than a predetermined threshold. The switching condition may be such that a predetermined time has elapsed since the previous switching of the buffers 42 and 43, or the like, in place of or in addition to the case where the free space of the write buffer has become equal to or less than a predetermined threshold. The buffer controller 41 proceeds to step S42 when the switching condition between the buffers 42 and 43 has been satisfied, or proceeds to step S43 when the switching condition has not been satisfied.

(Step S42) The buffer controller 41 switches the buffers 42 and 43 with regard to the write buffer. Accordingly, the write buffer becomes the sort buffer and the sort buffer becomes the write buffer, of the buffers 42 and 43.

(Step S43) The buffer controller 41 writes the event data which has become the target of the write request to the write buffer and terminates the buffer control procedure.

Figure 19:
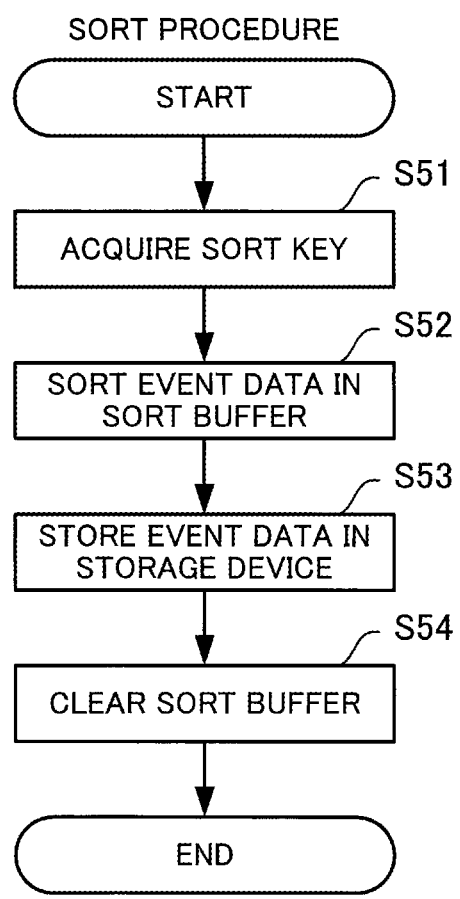
FIG. 19 illustrates a flowchart of a sort procedure of the second embodiment.

Next, a sort procedure of the second embodiment will be described, referring to FIG. 19. FIG. 19 illustrates a flowchart of the sort procedure of the second embodiment.

The sort procedure is a process of sorting event data sets accumulated in the buffer and storing the event data sets in the storage devices 50. The sort procedure is a process performed by the sort unit 44 triggered by the switching of the buffers 42 and 43.

(Step S51) The sort unit 44 acquires a sort key from the key information storage unit 45.

(Step S52) The sort unit 44 sorts the event data sets in the sort buffer by the acquired sort key, referring to the metadata assigned to the event data sets. Furthermore, the sort unit 44 performs sorting in a time series order for each set of event data sorted by the sort key.

(Step S53) The sort unit 44 stores the event data sets read from the sort buffer in the storage devices 50.

(Step S54) The sort unit 44 clears the sort buffer and terminates the sort procedure.

Accordingly, the storage system 10 may reduce the read load in the storage system 10, and suppress degradation of write performance due to competition between write and read accesses on the storage devices 50.

When the number of attributes of metadata is larger than the number of servers performing mirroring of event data, the storage system 10 may assign the attribute of metadata frequently used as a search condition to the servers performing mirroring of event data.

Although the client 11, the proxy 13, and the servers 15, 16 and 17 are respectively provided in separate information processing apparatuses in the second embodiment, they may be provided in any combination to one or two or more information processing apparatuses. For example, a single information processing apparatus may implement the proxy 13 and the servers 15, 16 and 17. Alternatively, a single information processing apparatus may implement the client 11 and the proxy 13.

The sort unit 44 may alternately switch, each time switching the buffers 42 and 43, the ascending order and the descending order when performing sorting by the sort key. For example, when the buffer 42 is the sort buffer, the server 15 sorts the transmission source IP addresses in the order of "192.168.0.1", "192.168.0.2", and "192.168.0.3" (ascending order). When, on the other hand, the buffer 43 is the sort buffer, the server 15 sorts the transmission source IP addresses in the order of "192.168.0.3", "192.168.0.2", and "192.168.0.1" (descending order). Accordingly, it may be expected in the storage system 10 that the event data sets to be stored in the storage devices 50 are arranged with the same attribute before and after buffer switching.

Although the servers 15, 16 and 17 each have two buffers 42 and 43, this is not limiting and three or more buffers may be provided for rotation.

Although the servers 15, 16 and 17 each have two buffers 42 and 43, a single ring buffer having a sufficient size may be alternatively provided. In this case, the sort unit 44 only may perform sorting of event data sets which have been accumulated in the ring buffer in excess of a predetermined threshold value.

Although the storage system 10 is configured to perform mirroring for each of the servers 15, 16 and 17, mirroring may be performed for each of the HDDs 51, 52 and 53 provided in the server 15. In this case, the server 15 may be provided with a function of distributing I/O requests to the HDDs 51, 52 and 53, in place of the request distributing function provided in the proxy 13. In addition, the server 15 may provide a buffer for each of the HDDs 51, 52 and 53, or may provide a buffer common to the HDDs 51, 52 and 53.

In addition, although the storage system 10 is configured to perform mirroring for each of the servers 15, 16 and 17, the storage system 10 may perform replication for each of the servers 15, 16 and 17. In addition, the storage system 10 may perform replication for each of the HDDs 51, 52 and 53 provided in the server 15.

The aforementioned processing functions may be realized by a computer. In such a case, there is provided a program having described therein details of the processing of the functions desired to be installed in the storage apparatus 1, the client 11, the proxy 13, and the servers 15, 16 and 17. The aforementioned processing functions are realized on a computer by causing the computer to execute the program. The program having described therein details of the processing may be stored on a computer-readable storage medium. A magnetic storage device, an optical disk, a magneto-optical storage medium, a semiconductor memory, or the like, may be used as the computer-readable storage medium. A hard disk drive (HDD), a flexible disk (FD), a magnetic tape, or the like may be used as the magnetic storage device. A DVD, a DVD-RAM, a CD-ROM/RW, or the like, may be used as the optical disk. An MO (Magneto-Optical disk) or the like may be used as the magneto-optical storage medium.

When distributing a program, portable storage media such as DVD or CD-ROM, for example, storing the program are put on the market. In addition, the program may be stored in a storage apparatus of a server computer, and the program may be transferred from the server computer to other computers via a network.

A computer supposed to perform a program stores, in a storage apparatus of the same computer, the program stored on a portable storage medium or the program transferred from a server computer. The computer then reads the program from the storage apparatus of the same computer and performs processing according to the program. The computer may also read the program directly from a portable storage medium and perform the processing according to the program. In addition, whenever a program is transferred from a server computer connected via a network, the computer may also sequentially perform the processing according to received program.

In addition, at least a part of the aforementioned processing functions may be realized by an electronic circuit such as a DSP, an ASIC, a PLD, or the like.

According to an aspect, the storage apparatus, the data storage program, and the data storage method may suppress degradation of write performance due to competition between write and read accesses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus comprising a processor configured to perform a procedure including:
    acquiring a data block including first attribute information, second attribute information which is different from the first attribute information, and time series information with which a time series order of data blocks is identifiable and temporarily accumulating the data block in a first temporary memory;
    acquiring the data block, and temporarily accumulating the data block in a second temporary memory;
    sorting, by using the first attribute information for a first sort key, a plurality of data blocks accumulated in the first temporary memory, and storing the sorted data blocks in a first memory; and
    sorting, by using the second attribute information for a second sort key, a plurality of data blocks accumulated in the second temporary memory, and storing the sorted data blocks in a second memory.

2. The storage apparatus according to claim 1, wherein
    the storing in the first memory includes further sorting, in a time series order, the data blocks which have been sorted by the first attribute information, and
    the storing in the second memory includes further sorting, in a time series order, the data blocks which have been sorted by the second attribute information.

3. The storage apparatus according to claim 1, wherein the procedure further includes, upon receiving a read request for a plurality of data blocks including same first attribute information, determining the first memory as a target from which the data blocks are read.

4. The storage apparatus according to claim 1, wherein the procedure further includes, upon receiving a read request for a plurality of data blocks including same second attribute information, determining the second memory as a target from which the data blocks are read.

5. The storage apparatus according to claim 1, wherein the procedure further includes, upon receiving a read request for a plurality of data blocks including continuous values of the first attribute information, determining the first memory as a target from which the data blocks are read.

6. The storage apparatus according to claim 1, wherein the procedure further includes, upon receiving a read request for a plurality of data blocks including continuous values of the second attribute information, determining the second memory as a target from which the data blocks are read.

7. The storage apparatus according to claim 1, wherein the data block includes event data which is a mass of data having a specified attribute determined based on stream data.

8. A non-transitory computer-readable storage medium storing a data storage program that causes a computer to perform a procedure comprising:
    temporarily accumulating, in a first temporary memory, a data block including first attribute information, second attribute information which is different from the first attribute information, and time series information with which a time series order of data blocks is identifiable;
    temporarily accumulating the data block in a second temporary memory;

sorting, by using the first attribute information for a first sort key, a plurality of data blocks accumulated in the first temporary memory, and storing the sorted data blocks in a first memory; and sorting, by using the second attribute information for a second sort key, a plurality of data blocks accumulated in the second temporary memory, and storing the sorted data blocks in a second memory.

9. A storage system comprising:

a first information processing apparatus configured to provide an access request to storage apparatuses, a second information processing apparatus configured to control access to a first storage apparatus among the storage apparatuses, a third information processing apparatus configured to control access to a second storage apparatus among the storage apparatuses, and a fourth information processing apparatus capable of transferring the access request to the second information processing apparatus and the third information processing apparatus, the first information processing apparatus includes a processor configured to perform a procedure including composing event data having a predetermined attribute from stream data, and generating a write request to write, in the storage apparatus, a data block including the event data, identification information for identifying the event data and attribute information on the attribute;

the fourth information processing apparatus includes a processor configured to perform a procedure including transferring the write request acquired from the first information processing apparatus to the second information processing apparatus and the third information processing apparatus;

the second information processing apparatus includes a processor configured to perform a procedure including, upon receiving the acquired write request, temporarily accumulating a plurality of data blocks in a first temporary memory, sorting, by using first attribute information of the attribute information for a first sort key, the data blocks accumulated in the first temporary memory, and storing the sorted data blocks in the first storage apparatus; and the third information processing apparatus includes a processor configured to perform a procedure including, upon receiving the acquired write request, temporarily accumulating a plurality of data blocks in a second temporary memory, sorting, by using second attribute information of the attribute information for a second sort key, which is different from the first attribute information, the data blocks accumulated in the second temporary memory, and storing the sorted data blocks in the second storage apparatus.

10. The storage system according to claim 9, wherein:

the procedure performed by the first information processing apparatus further includes generating a read request of the data blocks stored in the storage apparatus; and the procedure performed by the fourth information processing apparatus further includes selecting one of the second information processing apparatus and the third information processing apparatus based on attribute information of the data block which is a read target of the read request, and transferring the read request acquired from the first information processing apparatus to the selected information processing apparatus.

11. The storage system according to claim 9, wherein:

the procedure performed by the second information processing apparatus further includes further sorting, in a time series order, the data blocks sorted by the first attribute information; and the procedure performed by the third information processing apparatus further includes further sorting, in a time series order, the data blocks sorted by the second attribute information.

12. The storage system according to claim 9, wherein the procedure performed by the fourth information processing apparatus further includes: upon receiving a read request including the first attribute information, transferring the read request to the second information processing apparatus; and upon receiving a read request including the second attribute information, transferring the read request to the third information processing apparatus.

13. The storage system according to claim 9, wherein the third information processing apparatus is included in the second information processing apparatus.

14. The storage system according to claim 9, wherein the fourth information processing apparatus is included in the second information processing apparatus.

* * * * *